Aug. 3, 1965  D. R. SUNDERLAGE  3,198,509
CLAMP FOR SECURING WORK PIECE TO MACHINE TOOL TABLE
Filed Nov. 19, 1962
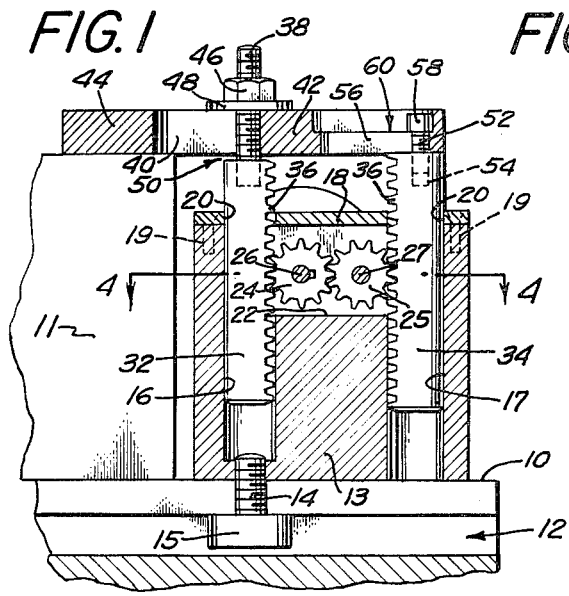
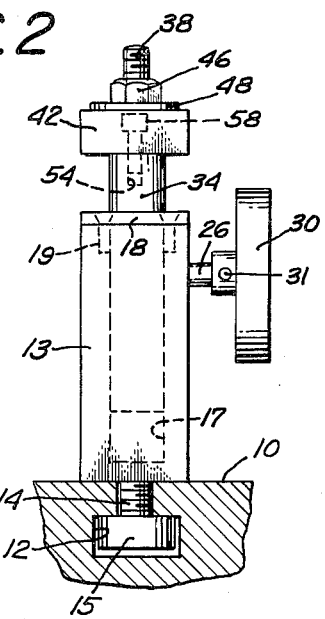
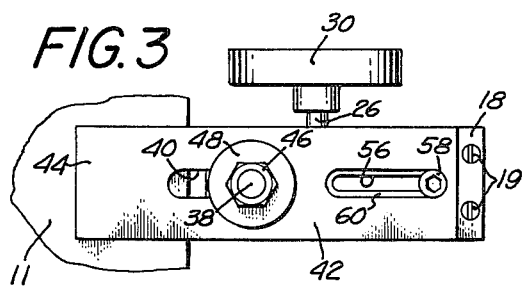
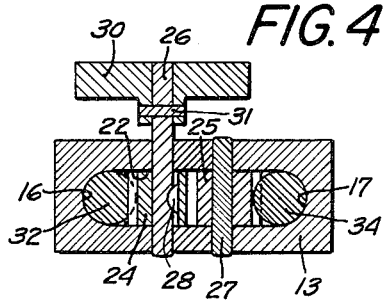
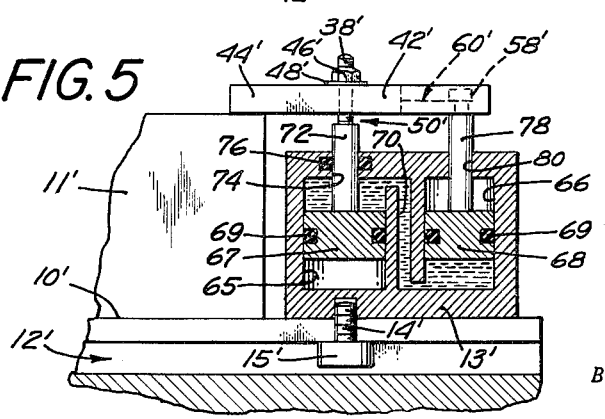
INVENTOR.
DAVID R. SUNDERLAGE
BY *Herbert E. Kidder*
AGENT ic patent Office 3,198,509
Patented Aug. 3, 1965

3,198,509
CLAMP FOR SECURING WORK PIECE TO
MACHINE TOOL TABLE
David R. Sunderlage, 4139 Manchester Place,
Riverside, Calif.
Filed Nov. 19, 1962, Ser. No. 238,566
8 Claims. (Cl. 269—20)

The present invention relates generally to machine tools, and more particularly to a new and unique clamp for holding a work piece on the bed or table of a machine tool, such as a milling machine, planer, or the like.

Heretofore, the customary method of clamping a work piece to a machine table has been to use a plurality of strap clamps, each of which comprises a bar having an aperture near its midpoint, through which a bolt extends. The head of the bolt is engaged in a T-shaped groove or channel in the machine table, and a nut is screwed down onto the threaded end of the bolt projecting above the bar. One end of the bar is placed so that it overlies an edge of the work piece, and the other end is placed on a block or stack of blocks, the top of which is approximately level with that portion of the work piece engaged by the said one end of the bar. The nut is then drawn down tightly against the bar, causing the one end thereof to clamp the work piece to the table. Usually, a number of strap clamps having different bolt lengths are required, because of variations in the height of the work piece above the table, and a considerable number of blocks of all sizes must be kept on hand to allow for building stacks of varying heights. These prior strap clamps are inconvenient to use, and time-consuming to set up. The blocks must be carefully stored when not in use, and are subject to being misplaced or lost. Moreover, it is sometimes difficult to build stacks of blocks to the exact desired height.

The primary object of this invention is to provide a new and improved clamp of the class described, which is fast-acting, self-contained, and extremely versatile in use.

Another object of the invention is to provide a fast-acting clamp that requires no blocks or other accessory equipment other than a wrench.

A further object of the invention is to provide a strap clamp that is inexpensive to manufacture, compact, and sturdy in construction.

The foregoing and other objects and advantages of the present invention will become apparent to those skilled in the art upon consideration of the following detailed description of the preferred embodiment thereof, reference being had to the accompanying drawing, wherein:

FIGURE 1 is a vertical sectional view through a strap clamp embodying one form of the present invention;

FIGURE 2 is an end view of the same;

FIGURE 3 is a top view of the same;

FIGURE 4 is a horizontal sectional view, taken at 4—4 in FIGURE 1; and

FIGURE 5 is a view similar to FIGURE 1, showing another embodiment of the invention.

Referring first to FIGURES 1-4 of the drawings, the reference numeral 10 designates the bed, or table, of a machine such as a milling machine, upon which a work piece 11 is to be secured by the strap clamp of this invention. The table 10 is formed with one or more grooves or channels 12 in the form of an inverted T. In the preferred form of the invention, the clamp comprises a body 13, which is secured on table 10 by a bolt 14 having a head 15 engageable with one of the channels or grooves 12. The body 13 is in the form of a steel block of generally rectangular configuration, having a pair of parallel vertical bores 16 and 17 provided therein. A plate 18 is secured to the top of the body 13 by screws 19, and has apertures 20, which align with the bores 16 and 17.

A cavity 22 is formed in the upper portion of the block 13, between the bores 16, 17, and a pair of meshing gears 24 and 25 respectively, are positioned within the recess and mounted on shafts 26 and 27, respectively. Gear 24 is non-rotatably secured on shaft 26 by means of a key 28, and one end of shaft 26 projects laterally from the housing and has a handwheel 30 mounted thereon. The handwheel 30 is non-rotatably secured on the shaft by a pin 31. Slidably disposed within the bores 16 and 17, respectively, are cylindrical posts 32 and 34, the facing sides of which are formed with rack teeth 36 that mesh with the teeth of the adjacent gears 24, 25. Inasmuch as the gears 24, 25 intermesh with one another as well as with their respective rack teeth 36, the two gears are caused to turn in opposite directions when both of the posts 32 and 34 move upwardly or downwardly simultaneously. The intermeshing gears prevent the posts from moving in opposite directions, and it is upon this characteristic that the present invention depends.

A threaded stud 38 is attached to the top end of post 32 and projects upwardly therefrom through an elongated slot 40 in a clamp bar 42. The bar 42 extends horizontally across the top ends of the two posts 32, 34, and one end 44 of the bar projects laterally beyond the side of the body 13 adjacent post 32. A nut 46 is screwed down onto the threaded stud 38 and bears against a washer 48, which rests on top of the bar 42. In FIGURE 1, it will be noted that there is a gap at 50 between the top end of the left-hand post 32 and the bottom side of the bar 42, the purpose of which will be explained presently.

The right-hand post 34 is tightly secured to the bar 42 by means of a machine screw 52, which is threaded into a tapped hole 54 in the top end of the bar. The screw 52 extends upwardly through an elongated slot 56 in the bar 42, of the same length as the slot 40, and the head 58 of the screw is seated on a recessed shoulder 60. The two slots 40 and 56 extend lengthwise of the bar down the center thereof, and the slots are spaced with respect to one another so that when the stud 38 is at the right-hand end of slot 40, the screw 52 is likewise at the right-hand end of slot 56, as in FIGURE 1. When both the nut 46 and screw 52 have been loosened, the bar 42 can be shifted longitudinally within the length of the slots 40, 56, for the purpose of projecting the end 44 out to its extreme position, so as to overlie the work piece 11, or retracting the said end, as when placing the work piece on the machine table 10 or removing it therefrom.

To operate the clamp of my invention, the body 13 is first bolted to the machine table 10 adjacent the edge of the work piece 11, and the posts 32, 34, together with the clamping bar 42 are pulled upwardly by hand, or raised by turning the handwheel 30, until the bar is above the edge to be clamped. The bar 42 is then shifted outwardly so as to place the end portion 44 over the edge to be clamped, and the bar is lowered until it rests on the work piece. A wrench is applied to the nut 46, and the latter is drawn down tight. As this is done, the reaction of the nut 46 on the stud 38 exerts an upward pull on the stud and post 32, owing to the gap 50. At the same time, the downward pressure of the nut 46 on the bar 42 causes the bar to press downwardly at one end against the work piece 11 and at the other end against the post 34. The downward thrust of the post 34 is opposed, through the gears 24, 25, by the upward thrust of the post 32. As the posts 32, 34 are positively prevented from moving in opposite directions by the gears 24, 25, they are, in effect, solidly locked to the body 13, and the net effect is a downwardly clamping pressure exerted by the end 44 of the bar against the work piece 11. To release the bar, all that is required is to back off the nut 46 until all pressure is released, at which point the two posts 32, 34 and bar 42 can be freely raised or lowered with practically no effort.

Another embodiment of the invention is illustrated in FIGURE 5, wherein parts that are identical to those described above in connection with the embodiment of FIGURES 1-4, are given the same reference numerals with the prime (') suffix. In this form of the invention, the body 13' has two parallel cylindrical bores 65 and 66 arranged side by side, with their longitudinal axes perpendicular to the top of the machine table 10'. Slidably disposed within the bores 65, 66, respectively, are pistons 67 and 68, having O-ring seals 69 of rubber or other elastomeric material, which are seated within circumferential grooves in the pistons. The top end of bore 65 is connected to the bottom end of bore 66 by a passageway 70, and these spaces are filled solidly with hydraulic fluid.

Fixed to piston 67 and projecting upwardly therefrom is a piston rod 72, which corresponds to post 32 of the first embodiment. Piston rod 72 slides through a close-fitting aperture 74 in the top of the body 13', and is sealed by an O-ring seal 76, seated within a circumferential groove in the wall of the aperture. Another piston rod 78 is fixed to piston 68 and projects upwardly therefrom through an aperture 80 in the body, corresponding to the post 34 of the first embodiment. A clamping bar 42' is attached to the top ends of the piston rods 72 and 78 in the same manner that the bar 42 is attached to the posts 32, 34 of the first embodiment.

From an inspection of FIGURE 5, it will be noted that the diameters of bore 65 and piston 67 are slightly greater than the diameters of bore 66 and piston 68. The purpose of this differential in diameters is to provide the same volumetric capacity for the upper end of bore 65 as there is in the lower end of bore 66, which necessitates a larger diameter for bore 65 to make up for the volumetric displacement of piston rod 72; there being no piston rod in the bottom end of bore 66. Thus, when the pistons 67, 68 are both raised simultaneously, the fluid displaced from the top end of bore 65 is caused to flow through passageway 76 into the bottom end of bore 66.

The operation of the embodiment of FIGURE 5 is virtually the same as in the preceding embodiment. In this case, the hydraulic fluid flows freely from one cylinder bore to the other when the pistons are raised and lowered simultaneously without any opposing stresses applied to the piston rod. However, when the end 44' of the bar 42' is brought down against the work piece 11' and the nut 46' is tightened by a wrench, the upward pull exerted by the nut 46' on the piston rod 72 is opposed by the downward thrust exerted by the bar 42' on piston rod 78. The hydraulic fluid within the cylinder bores 65 and 66 prevents movement of the pistons in opposite directions, and the unit therefore becomes tightly locked, with the end 44' clamping tightly down against the work piece. To release the clamp, the nut 46' is merely loosened enough to relax its pull on stud 38', at which point the bar 42' and piston rods 72, 78 can be raised or lowered with little effort.

While I have shown and described in considerable detail what I believe to be the preferred embodiment of my invention, it will be understood by those skilled in the art that various changes may be made in the shape and arrangement of the several parts without departing from the broad scope of the invention as defined in the following claims.

I claim:

1. A clamp for securing a work piece to a machine tool table comprising, in combination, a body adapted to be secured on said machine tool table, a pair of posts disposed side by side and parallel to one another, said posts being slidably supported on said body, a horizontal bar carried at the top ends of said posts, one end of said bar projecting laterally to one side of said body and being adapted to overlie an edge of said work piece, means interconnecting said posts and allowing the same to move freely in the same direction but restraining said posts against movement in the opposite directions, the one of said posts adjacent said projecting end of said bar having a limited amount of longitudinal movement with respect to said bar, and means for drawing upwardly on said one post and reacting downwardly against said bar, said last-named means being operable to clamp said projecting end of said bar downwardly against said work piece to clamp the latter to said table, said means interconnecting said posts being operable to prevent the other of said posts from moving in opposition to said one post.

2. A clamp as set forth in claim 1, wherein said posts are provided on their adjacent sides with rack teeth, and said means interconnecting said posts consists of intermeshed pinions rotatably supported on said body, one of said pinions being meshed with the rack teeth on one of said posts, and the other pinion being meshed with the rack teeth of the other post.

3. A clamp as set forth in claim 1, wherein said horizontal bar is slidable lengthwise with respect to said posts, and means for rigidly securing said bar with respect to the post on the side opposite said projecting end.

4. A clamp as set forth in claim 1, wherein said means for drawing upwardly on said one post and reacting downwardly against said bar consists of a threaded stud projecting upwardly from the top end of said one post through an opening in said bar, and a nut screwed onto said stud and bearing downwardly against the top surface of said bar.

5. A device as set forth in claim 1, wherein each of said posts has a piston attached to the bottom end thereof, each of said pistons being slidable within a cylinder in said body, and said means interconnecting said posts consists of hydraulic fluid filling said cylinders on the top side of one piston and the bottom side of the other, and said body having a fluid passageway connecting said cylinders so that the fluid in one cylinder is in communication with the fluid in the other cylinder.

6. A clamp for securing a work piece to a machine tool table comprising, in combination, a body adapted to be secured on said machine tool table, a pair of laterally spaced, parallel posts disposed perpendicular to said work table and slidable vertically with respect to said body, a horizontal bar carried at the top ends of said posts and projecting laterally to one side of said body, said projecting end of said bar being adapted to overlie the adjacent edge of said work piece, said posts having rack teeth provided in the facing sides thereof, the one post adjacent said workpiece having a limited amount of freedom for vertical movement with respect to said bar, the other post being fixedly attached to said bar, a pair of intermeshed pinions rotatably supported on said body between said posts, one of said pinions being meshed with the rack teeth on said one post and the other pinion being meshed with the rack teeth on the other post, a threaded stud projecting upwardly from the top end of said one post through an opening in said bar, and a nut screwed onto said stud and bearing downwardly against the top side of said bar, said nut being operable to draw upwardly on said one post and to react downwardly against said bar, and said intermeshed pinions being operable to prevent said posts from moving in opposite directions.

7. A clamp as defined in claim 6, wherein one of said pinions is connected to a handwheel on the outside of said body, said handwheel being operable when rotated to raise or lower said posts simultaneously for the purpose of adjusting said bar vertically to the level of said work piece.

8. A clamp as defined in claim 6, wherein said threaded stud passes through an elongated slot extending lengthwise of said bar, and said other post is secured to said bar by a screw passing through another elongated slot extending lengthwise of said bar, whereby said bar can be shifted lengthwise with respect to said posts.

References Cited by the Examiner

UNITED STATES PATENTS

| | | | |
|---|---|---|---|
| 2,349,087 | 5/44 | Fraser | 269—92 |
| 3,073,589 | 1/63 | Hohwart | 269—227 XR |

FOREIGN PATENTS 103,485   2/24   Switzerland.

ROBERT C. RIORDON, *Primary Examiner.*